United States Patent [19]

Fasse et al.

[11] 4,161,143

[45] Jul. 17, 1979

[54] AUTOMATIC STEERING MECHANISM

[76] Inventors: Mark E. Fasse, 725 N. 92nd Ct., Apt. 106, Omaha, Nebr. 68114; Herbert C. Glesmann, 3608 S. 102nd St., Omaha, Nebr. 68124

[21] Appl. No.: 779,684

[22] Filed: Mar. 21, 1977

[51] Int. Cl.² ............................................. B62D 1/26
[52] U.S. Cl. .................................. 104/244.1; 172/23; 180/131
[58] Field of Search ............... 180/79, 131; 104/244.1, 104/247; 172/2, 3, 23, 26; 280/87.2

[56] References Cited

U.S. PATENT DOCUMENTS

| | | | |
|---|---|---|---|
| 1,590,323 | 6/1926 | Schubert | 137/595 |
| 2,555,793 | 6/1951 | Frye | 104/244.1 |
| 3,395,771 | 8/1968 | Moyer et al. | 180/79.2 R |
| 3,583,514 | 6/1971 | Taylor | 180/79 |
| 3,603,405 | 9/1971 | Arnold | 172/26 |
| 3,698,428 | 10/1972 | Gastin | 137/595 |
| 3,765,501 | 10/1973 | Burvee | 180/79.2 R |

Primary Examiner—Albert J. Makay
Assistant Examiner—Randolph A. Reese

Attorney, Agent, or Firm—Henderson & Sturm

[57] ABSTRACT

An automatic steering mechanism is provided for causing a large farm tractor or other prime mover to selectively follow a predetermined path such as a furrow previously formed in a field. It is contemplated that the prime mover is provided with a steering gear and a fluid power circuit for operating that steering gear. The automatic steering mechanism includes path sensing means such as a furrow follower mounted for deployment in a lowered position in the field furrow. A first linking assembly connects this furrow follower to a fluid power guidance valve functionally disposed in the fluid power circuit. Here, this first linking assembly interconnects the furrow follower and a valve spool. A second linking assembly interconnects the prime mover steering gear and a floating valve body. As these linking assemblies move the valve spool and valve body relative to one another, fluid flow is caused in the fluid power circuit to cause steering action. The valve can also be set to raise or lower the furrow follower between a raised inoperative position and a lowered operative position for engagement with the field furrow.

8 Claims, 22 Drawing Figures

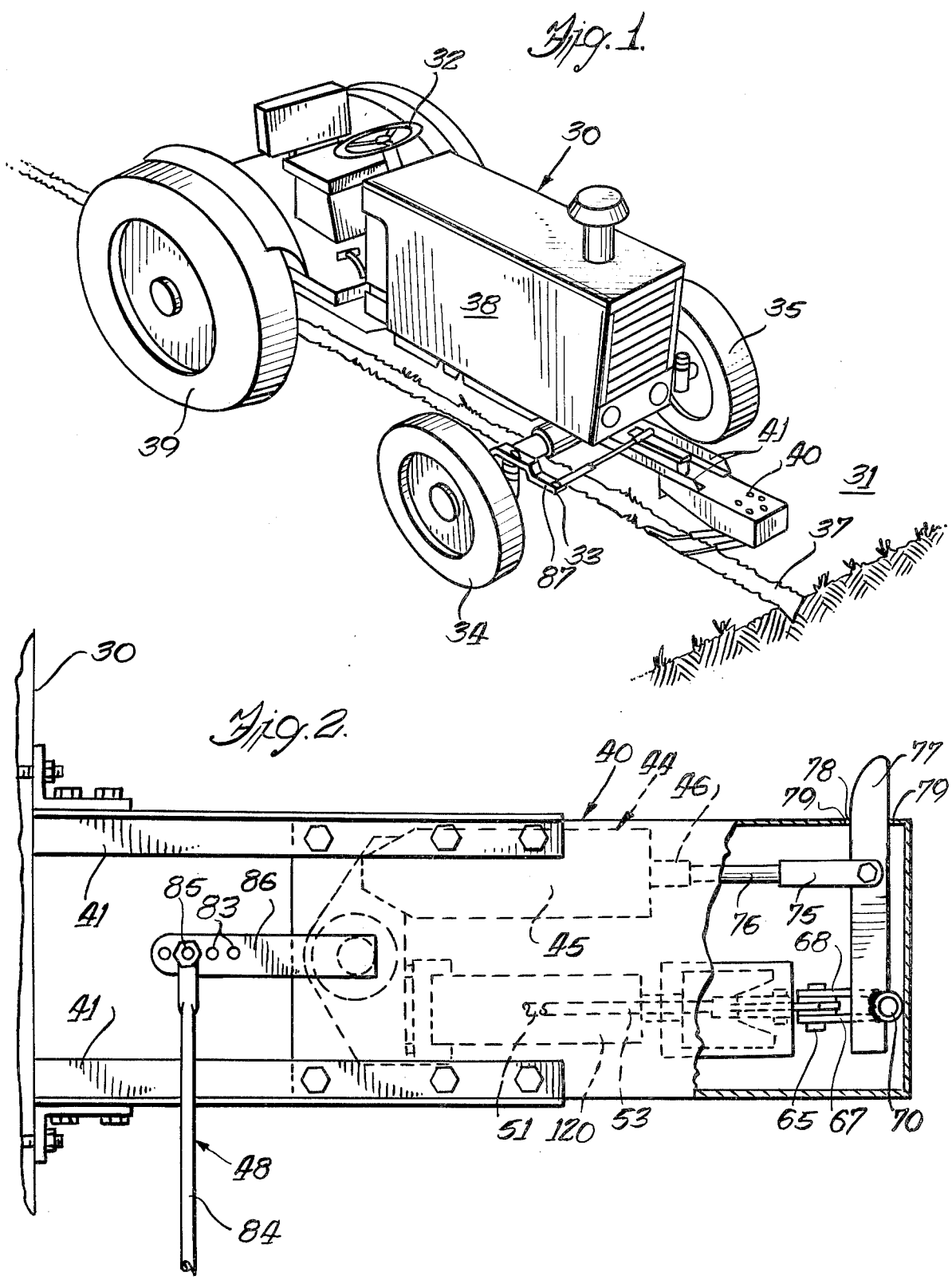

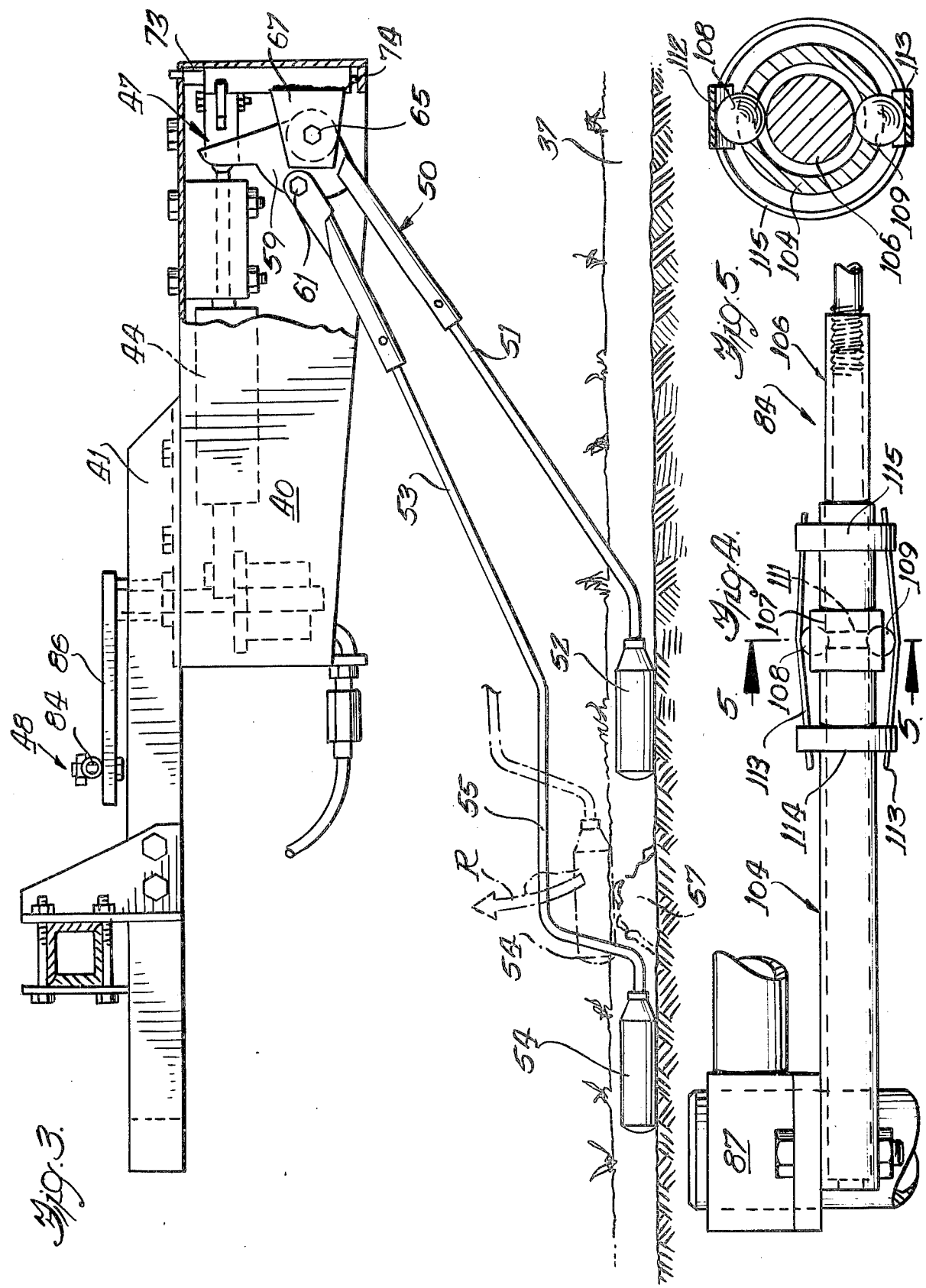

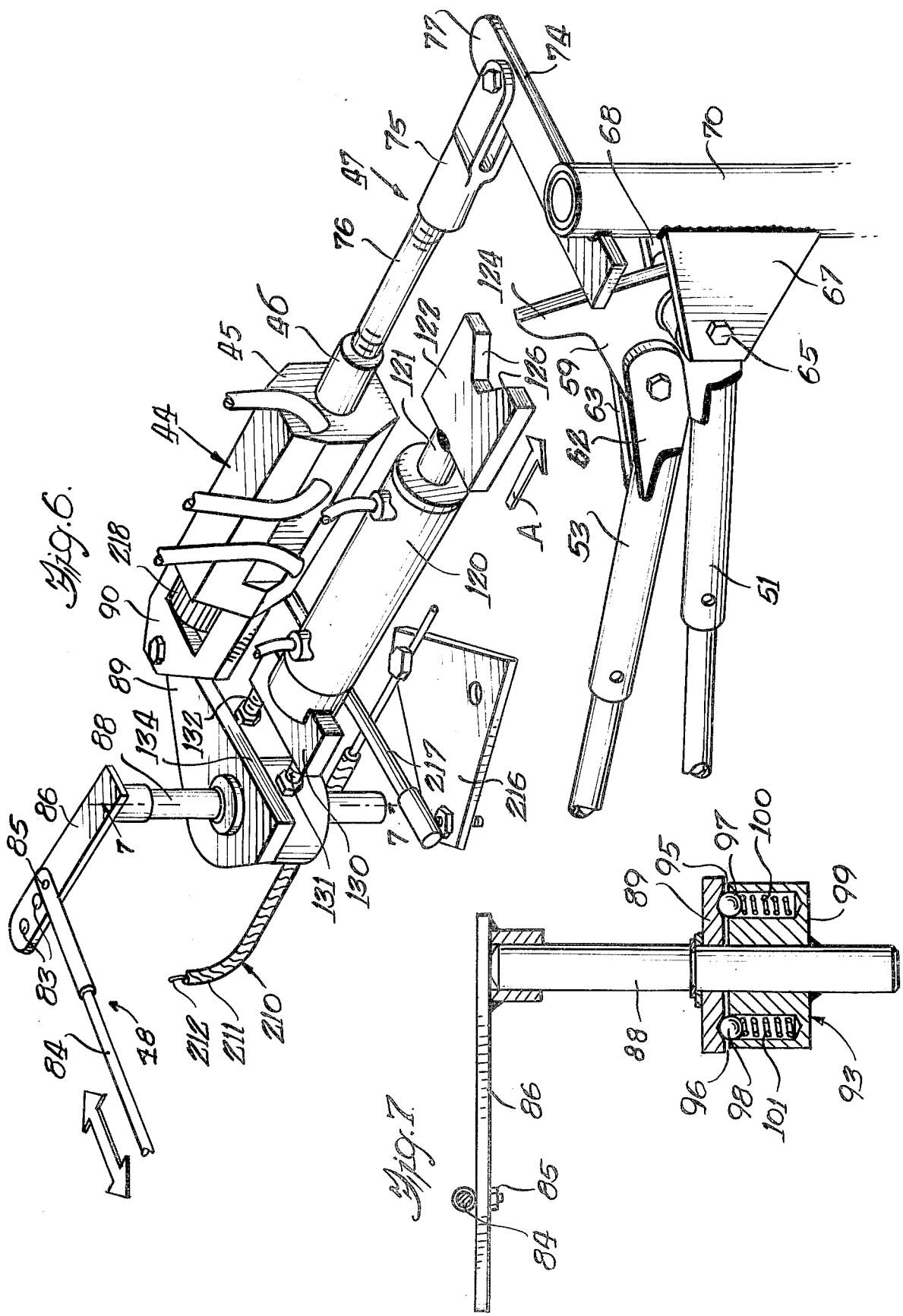

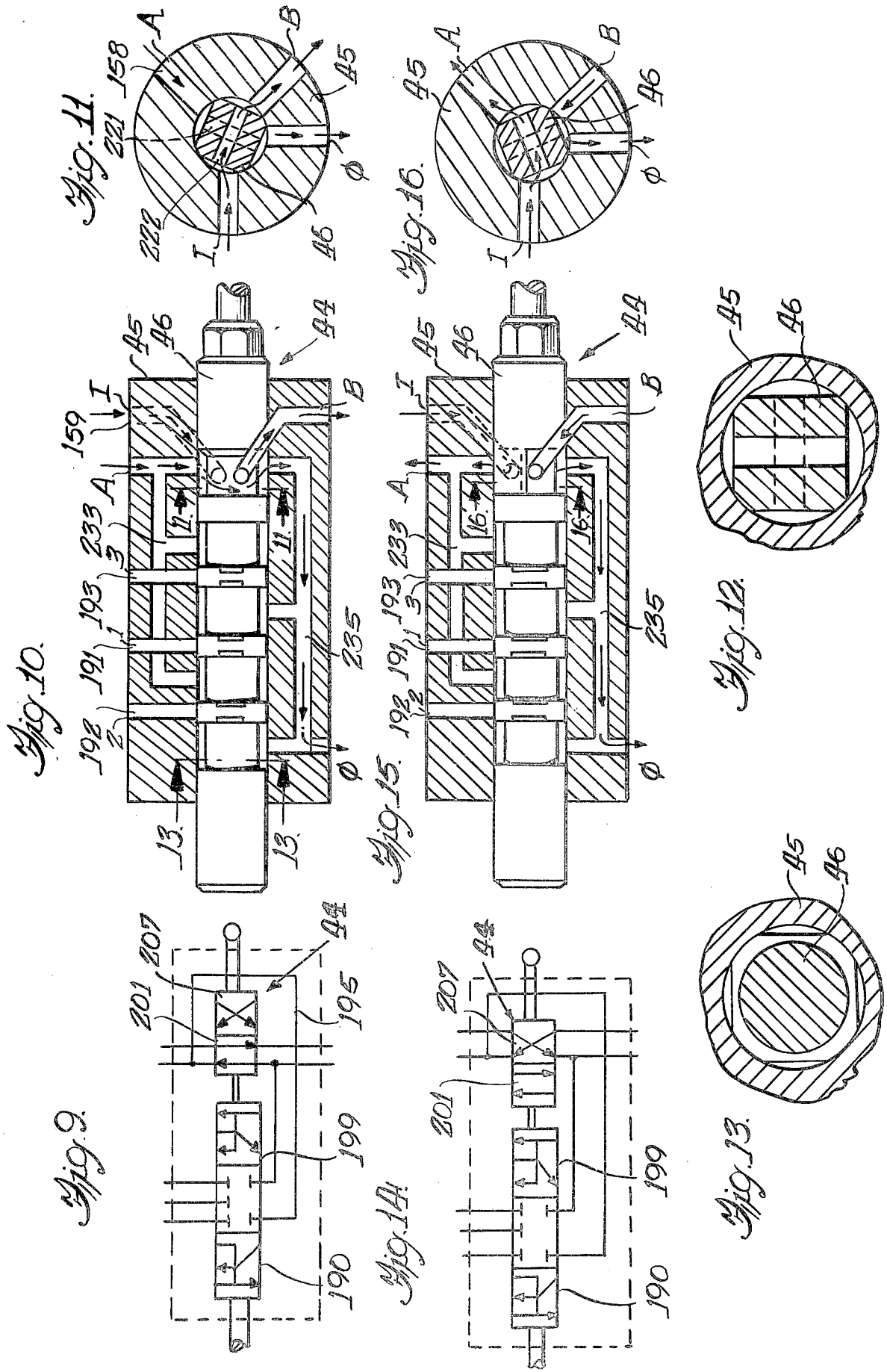

AUTOMATIC STEERING MECHANISM

BACKGROUND OF THE INVENTION

This invention relates generally to automatic controls for prime mover steering systems, and more particularly concerns an automatic steering system for a device such as a farm tractor.

In operating a prime mover such as a farm tractor in a field, the operator faces the tedious and tiring task of accurately guiding the prime mover and any pulled or operated implements with great precision along a predetermined path. For example, in plowing it is necessary to steer the pulling farm tractor so that evenly spaced furrows are created adjacent those furrows created in the last plow pass. The careful attention of the plowman is required in steering the tractor, yet he must also attend to adjusting tractor speed, plow depth and other variables.

To reduce this burden on the prime mover operator, a number of automatic steering devices have been offered to assist in tractor steering or to take over these steering jobs entirely. Until the present time, however, these devices have been more numerous than successful, and it is still the common practice to use manual steering methods to steer farm tractors while plowing, seeding, cultivating or otherwise treating field crops.

It is accordingly a general object of the present invention to provide a commercially attractive automatic steering mechanism for a prime mover such as a farm tractor.

A more specific object is to provide an automatic steering mechanism which will follow a previously formed furrow or other predetermined path in a field with consistency and accuracy. An ancillary object is to provide such an automatic steering mechanism which will accurately follow a predetermined route of travel at normal operating speeds without hunting or overcontrolling.

Yet another object is to provide an automatic steering mechanism for a prime mover which is reliable and rugged in operation. A related object is to provide such an automatic steering mechanism which can be offered at a commercially attractive price.

Another object is to provide an automatic steering mechanism of the type described having a value in which the position of the steering gear and the position of the path or furrow follower are sensed, and in which these position sensing activities are used to produce a steering output signal which is reliable and precise.

A related object of the invention is to provide an automatic steering mechanism of the type described having a valve or similar mechanism which provides steering input to a fluid power steering circuit and which also operates to raise and lower a furrow follower mechanism.

It is yet another object to provide such an automatic steering mechanism in which a hydraulic valve or similar mechanism can be positioned by a path or furrow follower device to cause the prime mover to be automatically steered in a direction following the path or furrow. Alternatively, the valve is effectively removed from the circuit when the furrow follower is raised to an inoperative position.

Other objects and advantages of the invention will become apparent upon reading the following detailed description and upon reference to the drawings.

Throughout the drawings, like reference numerals refer to like parts.

BRIEF DESCRIPTION OF THE DRAWINGS

FIG. 1 is a perspective view showing a portion of a preferred embodiment of the invention as it appears when in use with a prime mover such as a farm tractor following a furrow or like trench;

FIG. 2 is a top fragmentary view of the invention embodiment shown in FIG. 1;

FIG. 3 is a fragmentary side elevational view of the invention embodiment shown in FIGS. 1 and 2;

FIG. 4 is a fragmentary side elevational view of a steering gear connector arm compensator used with the invention;

FIG. 5 is a sectional view taken substantially in the plane of line 5—5 in FIG. 4;

FIG. 6 is a perspective view showing further detail portions of the furrow follower, guidance valve, lift cylinder and associated mechanisms carried by a housing;

FIG. 7 is a fragmentary sectional view taken substantially in the plane of line 7—7 in FIG. 6;

FIG. 9 is a schematic diagram of the guidance valve illustrating the valve spool and body positions and fluid flow path when the valve in its furrow-follower up, no-steering position;

FIG. 10 is a sectional view of the guidance valve showing the valve body, valve spool and fluid flow path schematically illustrated in FIG. 9;

FIG. 11 is a sectional view taken substantially in the plane of line 11—11 in FIG. 10;

FIG. 12 is a fragmentary sectional view similar to FIG. 11 and taken substantially in the plane of line 11—11 in FIG. 10 and showing in yet further detail the relationship between a portion of the valve spool and the surrounding valve body;

FIG. 13 is a fragmentary sectional view similar to FIGS. 11 and 12 taken substantially in the plane of line 13—13 in FIG. 10 and showing in still further detail portions of the valve spool and associated valve body;

FIG. 14 is a schematic diagram of the guidance valve similar to FIG. 9 but illustrating the valve spool and body positions and fluid flow paths when the valve is in its furrow-follower down, no-steering position;

FIG. 15 is a sectional view of the valve similar to FIG. 10 showing the valve body and spool and fluid flow paths in positions providing fluid flow corresponding to the fluid flow schematically illustrated in FIG. 14;

FIG. 16 is a sectional view similar to FIG. 11 but taken substantially in the plane of line 16—16 in FIG. 15;

DETAILED DESCRIPTION

Figure 8:
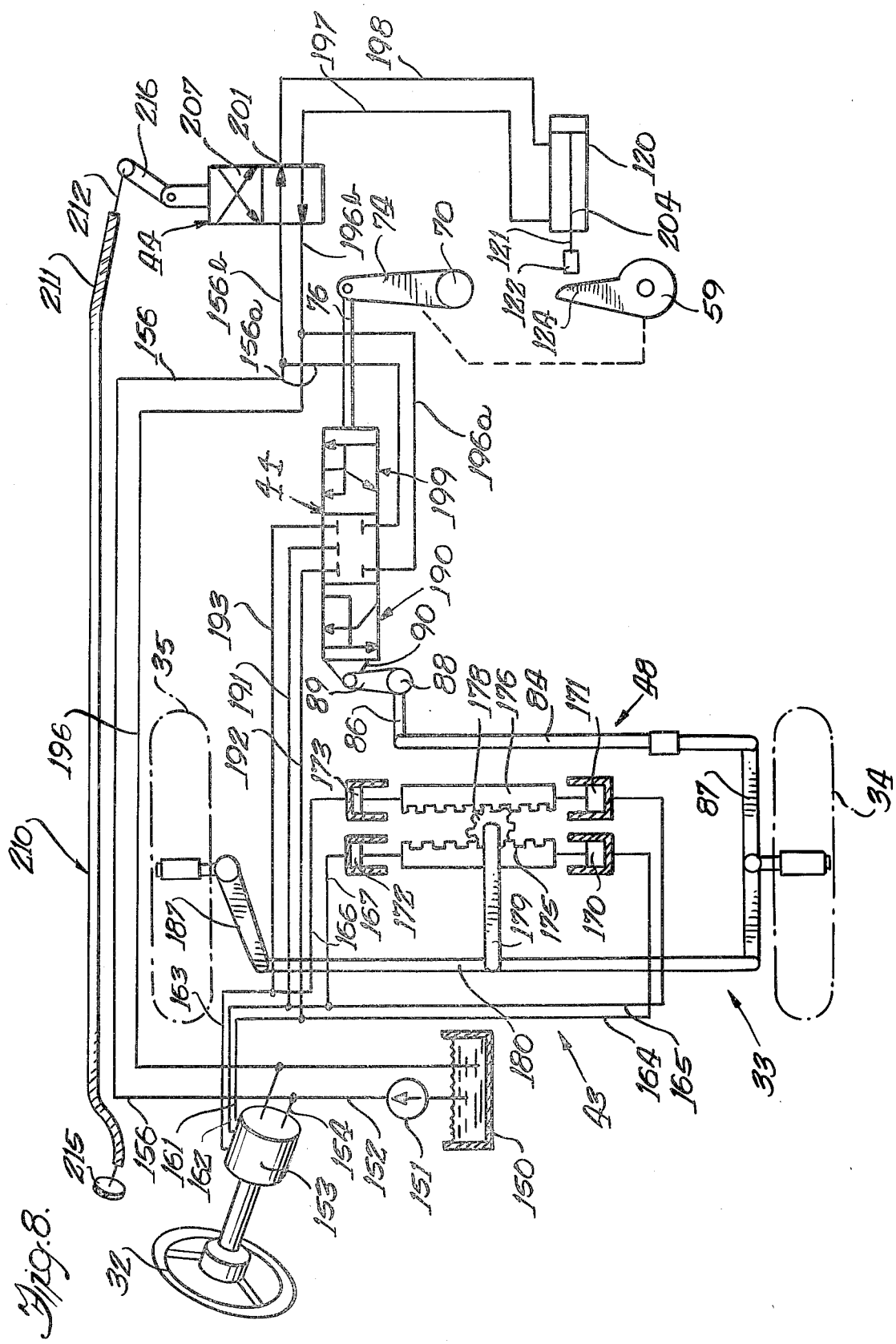
FIG. 8 is a schematic diagram of a hydraulic circuit including portions of the invention.

While the invention will be described in connection with a preferred embodiment, it will be understood that it is not intended to limit the invention to this embodiment. This application is intended to cover all alternatives, modifications and equivalents as may be included within the spirit and scope of the invention as defined by the appended claims.

GENERAL ARRANGEMENT

Turning first to FIG. 1, there is shown a prime mover 30 such as an ordinary large farm tractor as it may appear when traversing a field 31. As is well known, a tractor operator (not shown) can, by turning a steering wheel 32, manipulate steering gear 33 to turn tractor front wheels 34 and 35 either left or right so as to steer the tractor 30 a desired direction. When plowing, planting or tending row crops, this path or travel is usually that necessary to follow a predetermined path such as a trench or furrow 37 previously formed in the field 31. Power can be delivered by a prime mover engine 38 to rear wheels 39 so as to move the prime mover 30 over the field and pull a plow (not shown) or other suitable field working implement.

To cause the prime mover 30 to follow the path or furrow 37, an automatic steering mechanism is provided. Here, portions of this automatic steering mechanism are located in a box housing 40 which is appropriately mounted, as by angle irons 41 or other convenient structure, forwardly of the prime mover front wheels 34 and 35.

It is contemplated that this prime mover 30 is provided with a fluid power steering system 43 hydraulic circuit (partially diagrammed in FIG. 8) controlled by the steering wheel 32. In accordance with the invention, automatic steering is caused by a guidance valve 44 comprising a valve body member 45 and a spool member 46 (FIG. 6). In order that the valve 44 can steer the tractor 30 properly, one valve member (here the valve spool 46) is movably connected by a first linking assembly 47 to a predetermined path sensor which can be a furrow follower mechanism 50. Another valve member (here, the body 46) is movably connected to the steering gear 33 by a second linking assembly 48. As the linking assemblies 47 and 48 are moved by the path sensor or furrow follower 50 and the steering gear 33 respectively, the valve spool 46 and body 45 are positioned and re-positioned relative to one another to automatically cause steering action in the hydraulic circuit 43. Over-controlling is thus avoided.

FURROW FOLLOWER AND FIRST LINKAGE

To provide an indication of the direction of travel of the furrow 37 to the remaining portions of the automatic steering mechanism and the prime mover 30, a path sensing device such as a furrow follower mechanism 50 is carried partly in the housing 40 in a position to operate portions of the guidance valve 44 as illustrated in FIG. 3. Pursuant to the invention, the furrow follower 50 includes a first arm 51 terminating at a free end in a first probe 52 adapted for location in the furrow 37. A second arm 53 is carried vertically above the first arm 51 and terminates at its free end in a second probe 54. By providing an appropriate relief bend 55 in the second arm 53, the first and second probes 52 and 54 respectively can be carried one behind the other in a trail position configuration. During operation, when one of the probes encounters obstruction such as a clod 57 which may be accidentally deposited in the bottom of the trench 37, that probe (here, the second probe 54) simply rises in a vertical plane as illustrated by the arrow R and, after passing the obstruction 57, returns to its normal position in the furrow 37. No false turn requirement indication is transmitted to the remaining portions of the automatic steering system. Moreover, because the other probe (here, the first probe 52), is located at a spaced apart position in the furrow 37, that other probe 52 does not encounter the obstruction 57 at the same time as the probe 54 under consideration. Thus, accurate directional sensing indications are transmitted by the probes 52 and 54 to the remaining portions of the automatic steering mechanisms.

As illustrated in FIGS. 3 and 6, these arms 51 and 53 and the carried probes 52 and 54 are pivotably mounted for motion in the vertical plane so as to follow the furrow 37 upon a probe drag plate 59. In the illustrated embodiment, the second arm 53 is pivoted on the probe drag plate 59 as by a bolt 61 loosely fitted through second arm ears 62 and 63 and an aperture (not shown) in the probe drag plate 59 itself. To permit the probe arms to be raised from their operative positions shown in FIG. 3 to inoperative positions as will be explained later, the first arm 50 is fixed, by weldments or other known devices, to the probe drag plate 59. When the plate 59 and first arm 51 are lifted, the first arm 51 engages the underside of the second arm 53, and both arms 51 and 53 are thereafter raised together.

As the tractor is powered across the field 31 and over the furrow 37 by its engine 38, any tendency for the tractor to wander away from its designated position over the furrow 37 will cause the probes 52 and 54 and the attachment arms 51 and 53 to be angularly displaced in the horizontal plane of the field 31. Alternatively, if the furrow 37 is formed so as to veer off in a curving right-hand or left-hand direction, the probes, on encountering this change of furrow direction, will again similarly be angularly offset in the horizontal plane.

This angular offsetting motion will be transmitted from the probes 52 and 54 through the arms 51 and 53 to the probe drag plate 59. To permit the drag plate 59 to swing horizontally the plate 59 is journaled, as by a bolt 65, upon two ears 67 and 68 which are affixed, as by weldments or other known means, to a pivot post 70. This post 70 is here journaled upon the housing 40 by oppositely disposed bearings 73 and 74.

As the post 70 pivots, this motion is transmitted by the first linkage 47 to the guidance valve 44. Here, as shown in FIG. 6, this linkage 47 comprises a furrow follower lever 72, an offset swivel connection 75 and a connector extension 76 fixed to the guidance valve 44.

If desired, this pivoting motion can be limited by a lever arm extension 77 which extends through a slot 78 formed in the housing 40. The end points 79 of this slot 78 can be located to restrict rotational motion of the lever 72 and consequent rotational motion of the post 70 so as to avoid damage to the furrow follower 50, the linkage 47 or the valve 44 (FIG. 2).

STEERING GEAR AND SECOND LINKAGE

A second linking device 48 provides an indication to the guidance valve 44 of the position in which the steering gear 33 is located. More specifically, the valve body 45 will be located in any one of a range of positions by operation of the second linking assembly 48. Here, this second linking means 48 includes a transversely oriented compensator arm 84 pivotally connected as by a bolt 85 to an extended or offset arm 86. In carrying out the invention, greater or less indication of the steering gear displacement can be transmitted to the valve 44. To this end, the compensator arm 84 can be connected to the offset arm 86 in any one of a number of positions, as designated by arm apertures 83. As indicated especially in FIGS. 1-3 and 8, the compensator arm 84 is connected, in turn, to an extended steering knuckle link 87. As shown in FIGS. 6 and 8, motion of this link 87, the compensator arm 84 and the extension arm 86 rotate a steering linkage shaft 88 and an affixed steering linkage plate 89 to transmit motion to a connector clevis 90 secured to the guidance valve body 45.

In carrying out the invention, it is helpful to urge the compensator arm 84 and associated steering gear to be retained in a position corresponding to straight-ahead prime mover travel, so as to discourage steering overcorrection, wobble and hunting. To do this, a detent bearing unit 93 can be associated with the shaft 88 (FIG. 7.) Here, the plate 89 is provided with a plurality of detents 95, 96 on the plate underside. Detent balls 97 and 98 are pressed into engagement with the plate underside and the plate detents 95 and 96 as by springs 100 and 101 which are retained in a bearing unit clutch block 99.

It is a feature of the invention that if the steering gear is greatly displaced from its straight-ahead position, no damage will be done to the guidance valve 44 and associated linkage mechanisms 47 and 48. For example, if the front wheels 34 and 35 shown in FIG. 1 are turned to those positions associated with a full right-hand steering lock, the second linkage 48 will be greatly displaced from its straight-ahead sensing position. This great displacement would require a large rotational displacement of the interlinking plate 89 and might consequently cause damage to the guidance valve 44. To avoid this, the collapsible compensator arm 84 offers telescoping action. As illustrated in FIG. 4, the arm 84 includes an outboard end assembly 104 connected, as shown in FIG. 8, to the steering knuckle link 87. An inboard end 106 fits partly within the outboard end 104 and is adapted to move into and out of that end 104 with a telescopic action. To carry the ends 104 and 106 in a normally locked, fixed-length inter-relationship, a collar 107 on the first end 104 carries a series of detent balls 108 and 109 located to engage a detent groove 111 formed in the second or rod or inboard end 106. The detent balls 108 and 109 are retained in their illustrated positions by leaf springs 113 which are, in turn, carried upon collars 114 and 115. Thus once a given point of steering gear displacement is reached, increasing steering gear angular displacement is simply dissipated in the arm 84 without further corresponding valve body movement.

FURROW FOLLOWER LIFT AND VALVE POSITIONING

It is another feature of the invention that the furrow follower mechanism 50 and its probes 52 and 54 can be lifted from the operative lowered position shown in FIG. 3 to an inoperative raised position for vehicle over-road travel or the like. Moreover, the actuated lifting mechanism positions the first and second linking assemblies 47 and 48 and the associated valve body 45 and spool 46 in their respective straight-ahead positions when the furrow follower 50 is raised. When the valve members are so positioned, they do not affect the fluid power circuit 43 or interfere with normal steering actions accomplished with the steering wheel 32. To these ends, a furrow follower deployment device such as a lift cylinder 120 is carried in the housing 40 as illustrated in FIGS. 2 and 6. When the lift cylinder 120 is activated, it extends a cylinder rod 121 carrying a fork 122 for motion in the direction of the arrow A. This fork 122 engages an ear 124 extending from the main portion of the probe drag plate 59.

To center the furrow follower mechanism 50 and linked valve spool 46, this fork 122 is formed with a V-shaped ear engagement edge 126. As can be invisioned from FIG. 6, full extension of the lift cylinder rod 121 causes the fork 122 and its leading edge 126 to engage the probe drag plate ear 124 and rotate the drag plate 59 in the horizontal plane into a straight-ahead position. Drag plate rotation will, of course, also rotate the follower arms 51 and 53 into a straight-ahead position, and will cause the linkage post 70, swivel connection 75 and valve spool 46 to be respectively turned or pulled into their straight-ahead positions.

Deployment lift cylinder 120 actuation likewise locks the second linking assembly 48 into a straight-ahead travel position. To this end, a bridge plate 130 is here fixed, as by welding or other convenient means, to the blind end of the lift cylinder 120. Adjustable fingers 131 and 132, which may take the form of machine bolts threaded into the bridge plate 130, are adapted to engage an adjacent edge 134 of the plate 89 and to rotate and lock that plate 89 and the shaft 88 into a steering-gear-straight-ahead position. When the plate 89 is located in a straight-ahead indicating position, the clevis 90 to which the plate 89 is secured is also positioned in a straight-ahead position, and this motion pulls the valve body 45, as well, into the straight-ahead position. Thus, both the valve body 45 and the valve spool 46 are located in the prime mover straight-ahead-travel positions.

It should be noted, however, that locating the first linking assembly 47, the second linking assembly means 48 and the valve members 45 and 46 in their respective straight-ahead positions does not necessarily mean that the prime mover must be directed along a straight-ahead, linear path of travel. To the contrary, appropriate operator manipulation of the steering wheel 32 shown in FIG. 1 continues to provide appropriate steering motion to the steering gear 33 and to the front wheels 34 and 35. As the steering gear motion occurs, the motion is simply lost in the second linking assembly 48 within the compensator arm 84 by telescoping action between the arm ends 104 and 106 as described above before damaging forces are imposed upon the valve body 45.

VALVE AND HYDRAULIC CIRCUIT OPERATION

Hydraulic circuit and guidance valve action in cooperation with the first and second linking assemblies 47 and 48 can be understood by reference to FIGS. 8–22. As shown in FIG. 8, hydraulic fluid can be pumped from a reservoir 150 and pump 151 through a charging line 152 to a conventional hydraulic steering valve 153 by a branch line 154. Fluid is also supplied to a header line 156. In the illustration of FIG. 8, the header line 156 can be thought of as leading to input branches 156a and a lift cylinder branch line 156b.

When the furrow following mechanism is in its raised or lifted position, or when the vehicle is being steered in a straight-ahead position, the guidance valve 44 permits no fluid to flow from the supply branch line 156b to portions of the circuit which are directly downstream of the valve. Rather, steering is entirely provided through the normal steering valve 153. Fluid is caused to flow by this valve 153 through three lines 161, 162 and 163 and appropriately connected branches 164–167. As can be envisioned, fluid charge or inflow in, for example, the branches 164 and 166 and corresponding fluid exhaust or outflow in the lines 165 and 167 will appropriately actuate rack pistons 170–173 and the connected racks 175 and 176. Rack motion causes a pinion 178 to rotate and turn a whiffletree lever 179 so as to move a steering link 180. Motion of the link 180 operates knuckle links 87 and 187 and, in turn, pivots the wheels 34 and 35.

When, however, the valve body 45 and valve spool 46 are positioned (due to appropriate motion of the first and second linking assemblies 47 and 48) so as to call, for example, for a left hand turn, the fluid flow paths represented by the valve connection 190 are selected. Fluid can be considered to flow through the header input line 156 and branch 156a, the valve paths 190 and the valve automatic steering connector lines 191, 192 and 193. Tracing these fluid flow paths will show that fluid is directed outwardly through the guidance valve 44 and towards the rack pistons 171 and 172 through the branch line 191. Fluid is received from the rack pistons 170 and 173 through the branch lines 192 and 193. Forces are thus imposed upon the racks 175 and 176 to pivot the steering gear 33 and cause the desired left-hand turn.

After fluid is returned from the rack pistons 170–173 to the guidance valve 44 through the connector lines 192 and 193, the fluid flow path can then be thought of as leading through a branch line 196a to a main exhaust header 196 and to the fluid reservoir 150. Fluid can also be considered to return to the reservoir 150 from the furrow follower lift cylinder 120 by a lift cylinder branch exhaust line 197, 196b and the main exhaust header 196 as will be more fully explained below.

Conversely, when the first and second linking assemblies relatively position the valve body 45 and spool 46 so as to place the fluid flow paths 199 in communication with the rest of the circuit 43, fluid flows outwardly away from the valve 45 through branch lines 192 and 193, and flows inwardly toward the valve through the branch line 191. Again, forces are imposed upon the racks so as to slide the racks 175 and 176 in opposite directions and move the steering gear linkage so as to turn the prime mover wheels 34 and 35 to the right. Fluid returning to the valve 44 can be considered to move through return branches 196a and 196b to the main return line 196 and finally to the reservoir 150.

After fluid is returned from the rack pistons 170–173 to the valve 44 through the branch lines 192 and 193, the fluid flow path can then be thought of as leading through a branch line 196a to a main exhaust header 196 and to the fluid reservoir 150. Fluid can also be considered to return to the reservoir 150 from furrow follower lift cylinder 120 by a lift cylinder branch exhaust line 197, 196b and the main exhaust header 196 as will be more fully explained below.

In accordance with another aspect of the invention, this same guidance valve 44 can be used to deploy the furrow follower assembly either in its raised or its lowered position. To this end, when the valve fluid flow path is represented by the valve connections 201 are selected, fluid is transmitted from the header line 156 and 156b through the cylinder head end branch line 198 so as to drive the cylinder piston 204 and rod 121 to the left as shown in FIG. 8. This action pushes the fork 122 to the left, and permits the probe drag plate 59 to rotate in a counter-clockwise direction, thereby raising the probe arms. When it is desired to lower the sensor arms, fluid flow paths represented by the connection 207 are selected, and fluid is delivered from the output line 156 and 156b through the cylinder rod branch line 197, thereby urging the piston 204 to the right. Fluid is exhausted from the cylinder head end by branch line 198 to the valve 44 and the main exhaust collector line 196b and 196 and the fluid is thus returned to the reservoir 150.

In carrying out the invention and as indicated schematically in FIG. 8, the operator can select either of these alternate fluid flow paths from the operator's position on the prime mover so as to raise or lower the furrow follower 50 from a remote position. Here, this is accomplished through a Bowden cable 210 comprising a sheath 211 and a carried wire 212. Appropriate manipulation of a control 215 operates the wire 212 within the sheath 211 and moves a bell crank interconnector plate 216 to select the furrow-follower-raised or furrow-follower-lowered connections in the fluid flow path (FIGS. 6 and 8).

Actual valve operation is illustrated more specifically in FIGS. 6 and 9–22 inclusive. When the Bowden cable 210 in FIG. 8 is appropriately actuated, the plate 216 in FIGS. 8 and 6 pulls or pushes a bell crank link 217, and rotates a crank 218. The crank 218 is affixed by an extension (not shown) directly to the valve spool within the valve body. Thus actuation of the control 215 serves to angularly rotate or twist the valve spool 46 within the valve body 45 and to bring the spool and body into the relative position shown in FIGS. 9–11 inclusive. This mechanism also translates bowden cable wire motion in a direction generally parallel to the axis of the valve 44 into spool rotational motion in a plane generally perpendicular to that valve axis.

It will be noted that the right-hand portion of the valve spool 46 is formed with a square cross-section as more specifically shown in FIG. 11. Further, this square cross-section is provided with two generally perpendicular but not interconnected through bores 221 and 222. When the furrow follower is to be moved to its retracted or up position, the spool 46 is angularly rotated within the valve body 45 so as to locate the bores 221 and 222 as illustrated in FIGS. 9, 10 and 11. In this condition, fluid enters the valve body through an input port I from line 156, 156b and is discharged through another port B through line 198. Fluid returning from the lift cylinder 120 via the rod-end line 197 enters the valve through a port A and is discharged through an output port to the return or exhaust line 196b, 196.

Figure 17:
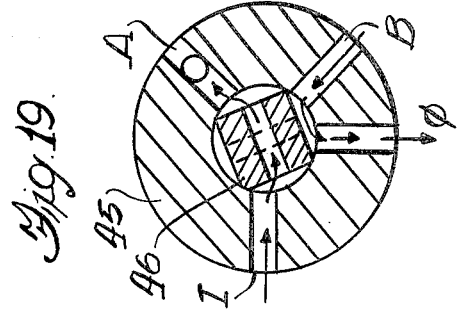
FIG. 17 is a schematic diagram of the guidance valve similar to FIGS. 9 and 14 but illustrating the valve spool and body positions and fluid flow paths when the valve is in its furrow-follower-down, left-hand-turn-steering position.
Figure 18:
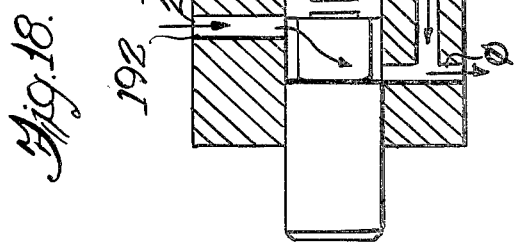
FIG. 18 is a schematic sectional view similar to FIGS. 15 and 10 and showing the relative valve body and spool positions and fluid flow paths illustrated schematically in FIG. 17.
Figure 19:
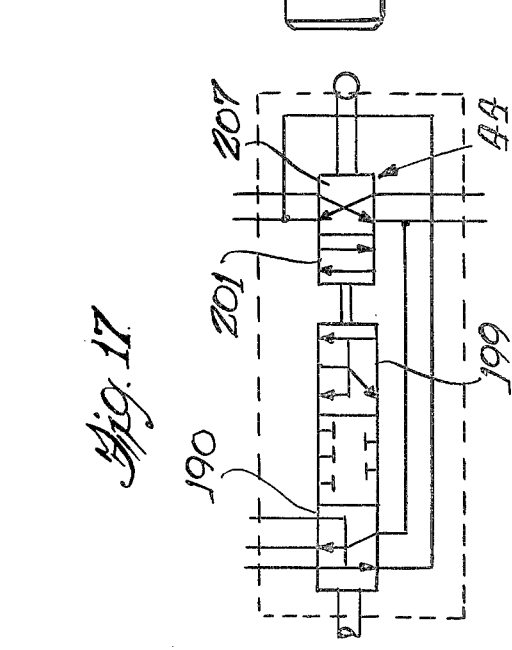
FIG. 19 is a sectional view similar to FIGS. 11 and 16 and taken substantially in the plane of line 19—19 in FIG. 18.

When the furrow follower is to be lowered, the spool 46 is angularly twisted inside the valve body 45 into the position shown in FIGS. 14–22. In this valve condition, fluid is received in the valve at the I port and is discharged through the B port and line 197 to the rod end of the cylinder 120. Correspondingly, fluid is exhausted from the head end of the cylinder to the branch line 198, arriving at the cylinder B port and moving through the valve for discharge at the output port φ. This fluid flow in the lift cylinder 120 causes the cylinder rod 121 to be withdrawn into the cylinder 120. When the probe drag plate 59 is rotated as indicated, the sensor arms are lowered as can be envisioned from FIG. 6. In carrying out the invention, it will be noted that when fluid flows into the valve with the valve spool in its furrow follower-lowered position, fluid can be distributed to and received from the steering gear lines 191–193. For example, when left hand steering is desired or required by the furrow follower, the spool valve is drawn slightly to the right, as indicated in FIGS. 17, 18 and 19. Under these conditions, fluid flowing into the valve through the I port can be discharged not only through the A port to assist in maintaining the furrow follower arms in their down position, but will also be discharged through the valve 1 port to line 191. Fluid will be received at the 2 and 3 ports from lines 192 and 193 respectively, and is discharged through the φ port to be returned to the reservoir 150. It will be noted again that this fluid flow arrangement in the lines 191, 192 and 193 operates the rack pistons 170–173 to cause appropriate motion of the racks 175 and 176 and the prime mover steering system.

In a somewhat similar manner, fluid being discharged from the spool toward the A port is branched to a longitudinally extending valve body communication tube 233 to other communicating portions of the spool and out through the appropriate ports. It will be understood that, while cross-overs are apparently shown in FIG. 18, mingling of fluid at the intersections does not occur since this axially extending communication tube 233 is angularly offset in known manner from the radially extending port tubes 1, 2 and 3, A and φ except where indicated. Likewise, a lower channel 235 carries fluid from the various spool path and ports A, 1, 2 and 3 to the output port φ as necessary.

It will be noted that, as the wheels 34 and 35 are turned to the left, and the steering gear 33 is appropriately actuated, the arms 84 and 86 and plate 89 will urge the guidance valve body 45 back over the valve spool 46 into a position again calling for straight-ahead steering. Thus, continuous steering sensing and steering feedback is applied to the guidance valve to cause the prime mover to follow the predesignated path of travel.

Figure 20:
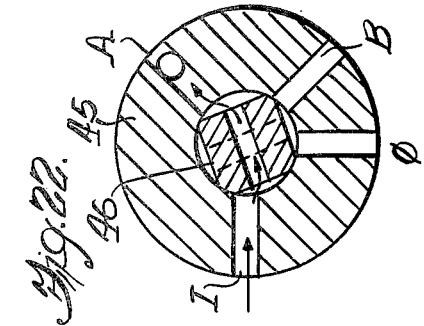
FIG. 20 is a schematic diagram similar to FIGS. 17, 14 and 9 but illustrating the valve spool and body positions and fluid flow paths when the valve is in its furrow-follower-down, right-hand-turn-steering position.
Figure 21:
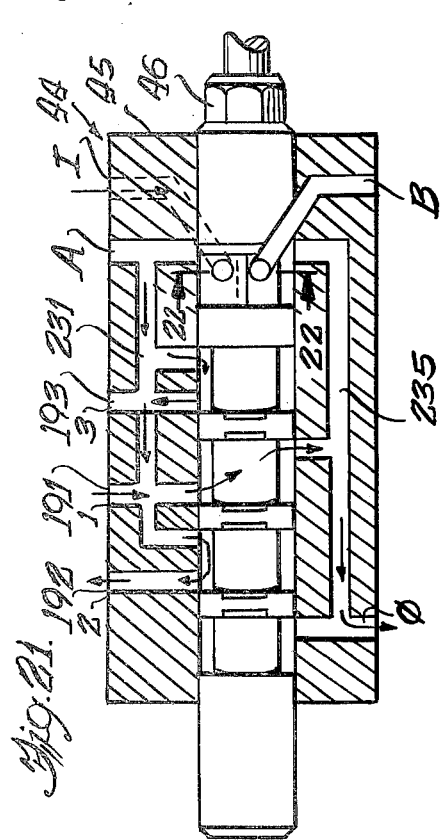
FIG. 21 is a schematic sectional view similar to FIGS. 18, 15 and 10 and showing the relative valve body and spool positions and fluid flow paths illustrated schematically in FIG. 20.
Figure 22:
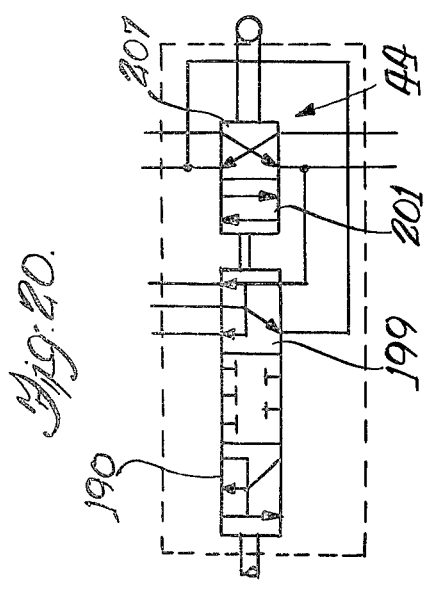
FIG. 22 is a sectional view similar to FIGS. 19, 16 and 11 and taken substantially in the plane of line 22—22 in FIG. 21.

Right hand steering can be commanded as shown in FIGS. 20–22 inclusive. Under these conditions, the valve spool 46 is urged to the left in FIG. 21 so as to provide a fluid path from the input port I which discharges through not only the A port to maintain the furrow follower in its lowered or sensing position, but also through the 2 and 3 ports to steering lines 191 through the 1 port and is discharged through the φ port. As explained above, such fluid flow will tend to cause the prime mover wheels 34 and 35 to begin a turn. As this turn begins, the second steering linkage 48 begins to cause the valve body 45 to move back over the spool 46 into the straight-ahead steering position. Again, the prime mover is thus caused to move precisely along the predetermined path of travel.

The invention is claimed as follows:

1. An automatic steering mechanism for causing a prime mover to selectively follow a furrow, the prime mover having a steering gear and a fluid power circuit for operating the steering gear, the automatic steering mechanism comprising a furrow follower mounted on the prime mover, furrow follower deployment means in the fluid power circuit for lowering the follower into a lowered position in a furrow and for raising the follower from the furrow into a raised position, and a multi-positionable guidance valve in the fluid power circuit selectively and operatively connected to the furrow follower and steering gear to cause the prime mover to be steered in the direction sensed by the furrow follower when the follower is in its lowered position, the guidance valve also including means for operating the follower deployment means to raise and lower the furrow follower from and to its lowered operative position in the furrow, and means for halting fluid flow to portions of the fluid power circuit which are downstream of the valve when the furrow follower is in its raised position, said furrow follower includes a probe means and a probe drag means connected to said probe means, said probe drag means permitting probe means displacement in a vertical plane without further furrow follower displacement, but following angular furrow follower displacement of said probe means in a horizontal plane with corresponding angular displacement, and said follower deployment means comprises a fluid power cylinder having a cylinder body in the fluid power circuit and cylinder rod means extending from the cylinder body and adapted to engage the probe drag means to rotate the probe drag means and the attached probe means in a vertical plane between the probe raised position and the probe lower position upon appropriate actuation of the guidance valve.

2. An automatic steering mechanism for causing a prime mover to selectively follow a furrow, the prime mover having a steering gear and a fluid power circuit for operating the steering gear, the automatic steering mechanism comprising a furrow follower mounted on the prime mover, furrow follower deployment means in the fluid power circuit for lowering the follower into a lowered position in a furrow and for raising the follower from the furrow into a raised position, and a multi-positionable guidance valve in the fluid power circuit selectively and operatively connected to the furrow follower and steering gear to cause the prime mover to be steered in the direction sensed by the furrow follower when the follower is in its lowered position, the guidance valve also including means for operating the follower deployment means to raise and lower the furrow follower from and to its lowered operative position in the furrow, and means for halting fluid flow to portions of the fluid power circuit which are downstream of the valve when the furrow follower is in its raised position, and said guidance valve includes a movable valve body member and a movable valve spool member carried at least partly within the valve body member and wherein said mechanism includes second linking means connecting a valve member to the prime mover steering mechanism to locate that valve member in a given position relative to the position of the steering gear and said second linking means includes compensation means permitting the steering gear to be moved to positions of increasing steering gear displacement from a straight ahead configuration without displacement of a valve member past a predetermined point.

3. An automatic steering mechanism for causing a prime mover to selectively follow a furrow, the prime mover having a steering gear and a fluid power circuit for operating the steering gear, the automatic steering mechanism comprising a furrow follower mounted on the prime mover, furrow follower deployment means in the fluid power circuit for lowering the follower into a lowered position in a furrow and for raising the follower from the furrow into a raised position, and a multi-positionable guidance valve in the fluid power circuit selectively and operatively connected to the furrow follower and steering gear to cause the prime mover to be steered in the direction sensed by the furrow follower when the follower is in its lowered position, the guidance valve also including means for operating the follower deployment means to raise and lower the furrow follower from and to its lowered operative position in the furrow, and means for halting fluid flow to portions of the fluid power circuit which are downstream of the valve when the furrow follower is in its raised position, said guidance valve including a movable valve body member and a movable valve spool member carried at least partly within the body member, and means for locking said guidance valve in a position to have no effect upon said fluid power circuit when said furrow follower is in its raised position, and said guidance valve locking means including means for locating both the guidance valve body and spool members in predetermined positions when said furrow follower means is in the follower raised position.

4. An automatic steering mechanism for causing a prime mover to follow a furrow, the prime mover having a steering gear and a fluid power circuit for operating the steering gear, the automatic steering mechanism comprising a multi-positionable steering guidance valve operatively connected to the fluid power circuit, the valve including a movable valve body member and a valve spool member carried at least partly within the body member for translational and independent rotational motion relative to the body, a furrow follower means adapted for selective engagement with a furrow and mounted on the prime mover to follow the furrow, first linking means connecting one valve member to the furrow follower to locate the valve member in any one of a range of positions in accordance with the furrow follower location, and second linking means connecting the other valve member to the steering gear to locate the other valve member in any one of a translational range of positions in accordance with the position of the steering gear, the relative translational positions of the valve body and valve spool providing a steering effect in the fluid power circuit to urge the steering gear toward alternative positions for prime mover right turn, left turn, or straight ahead travel whereby to cause the prime mover to follow a furrow, and relative rotational positions of the valve body and valve spool providing a lifting and lowering effect in the fluid power circuit to urge the furrow follower out of and into the furrow, the guidance valve further including means for halting fluid flow to portions of the fluid power conduit which are downstream of the valve when the furrow follower is in its raised position, and said furrow follower comprises probe means and a probe drag means to which said probe means is connected, the probe drag means permitting displacement of said probe means in a vertical plane without follower displacement, but following angular probe displacement of said probe means in a horizontal plane with corresponding angular follower displacement, and including locking means for locking the furrow follower means in a straight ahead position when the furrow follower is in its relatively raised configuration.

5. An automatic steering mechanism for causing a prime mover to follow a furrow, the prime mover having a steering gear and a fluid power circuit for operating the steering gear, the automatic steering mechanism comprising a multi-positionable steering guidance valve operatively connected to the fluid power circuit, the valve including a movable valve body member and a valve spool member carried at least parly within the body member for translational and independent rotational motion relative to the body, a furrow follower means adapted for selective engagement with a furrow and mounted on the prime mover to follow the furrow, first linking means connecting one valve member to the furrow follower to locate the valve member in any one of a range of positions in accordance with the furrow follower location, and second linking means connecting the other valve member to the steering gear to locate the other valve member in any one of a translational range of positions in accordance with the position of the steering gear, the relative translational positions of the valve body and valve spool providing a steering effect in the fluid power circuit to urge the steering gear toward alternative positions for prime mover right turn, left turn, or straight ahead travel whereby to cause the prime mover to follow a furrow, and relative rotational positions of the valve body and valve spool providing a lifting and lowering effect in the fluid power circuit to urge the furrow follower out of and into the furrow, the guidance valve further including means for halting fluid flow to portions of the fluid power conduit which are downstream of the valve when the furrow follower is in its raised position, said second linking means includes a compensator means permitting the steering gear to be moved to positions of increasing steering displacement from a straight ahead configuration without further displacement of a valve member past a predetermined point.

6. An automatic steering mechanism for causing a prime mover to follow a furrow, the prime mover having a steering gear and a fluid power circuit for operating the steering gear, the automatic steering mechanism comprising a multi-positionable steering guidance valve operatively connected to the fluid power circuit, the valve including a movable valve body member and a valve spool member carried at least partly within the body member for translational and independent rotational motion relative to the body, a furrow follower means adapted for selective engagement with a furrow and mounted on the prime mover to follow the furrow, first linking means connecting one valve member to the furrow follower to locate the valve member in any one of a range of positions in accordance with the furrow follower location, and second linking means connecting the other valve member to the steering gear to locate the other valve member in any one of a translational range of positions in accordance with the position of the steering gear, the relative translational positions of the valve body and valve spool providing a steering effect in the fluid power circuit to urge the steering gear toward alternative positions for prime mover right turn, or straight ahead travel whereby to cause the prime mover to follow a furrow, and relative rotational positions of the valve body and valve spool providing a lifting and lowering effect in the fluid power circuit to urge the furrow follower out of and into the furrow, the guidance valve further including means for halting fluid flow to portions of the fluid power conduit which are downstream of the valve when the furrow follower is in its raised position, said automatic steering mechanism further including locking means interconnecting the guidance valve means and the furrow follower means for locating the guidance valve members in predetermined positions when the furrow follower is located in the follower raised position.

7. An automatic steering mechanism for causing a prime mover to follow a furrow, the prime mover having a furrow follower movably mounted thereon, a steering gear, and a fluid power circuit for operating that steering gear, the automatic steering mechanism comprising a multi-positionable steering guidance valve operatively connected to the fluid power circuit to provide a steering effect, the valve including a valve body member movable relative to the prime mover, and a valve spool member carried at least partly within the body member for translational and independent rotational motion through a range of positions relative to the valve body member and the prime mover, first linking means connecting one valve member to the furrow follower, and second linking means connecting the other valve member to the steering gear, the relative positions of the valve body member and spool member providing a steering effect in the fluid power circuit to urge the steering gear toward alternative positions for prime mover steering, when the steering gear is in a lowered position, the guidance valve including means for halting fluid flow to portions of the fluid power circuit which are downstream of the valve when the furrow follower is in its raised position, said automatic steering mechanism further including means for sliding said valve spool into at least three axially spaced apart positions, wherein said valve body is provided with at least one fluid input port and a plurality of other fluid ports, and wherein at least one axial spool position disconnects the fluid input port from other fluid ports when the prime mover steering gear is located to cause prime mover straight ahead motion.

8. An automatic steering mechanism for causing a prime mover to follow a predetermined path, the prime mover having a steering gear and a fluid power circuit for operating the steering gear, the automatic steering mechanism comprising a multi-positionable steering guidance valve operatively connected to the fluid power circuit, the valve including a valve body member and a valve spool member carried at least partly within the body member for translational and independent rotational motion relative to the body, path sensing means for sensing the predetermined path, first linking means connecting one valve member to the path sensing means so as to locate the valve member in any one of a range of positions in accordance with the path sensing means condition, and second linking means connecting the other valve member to the steering gear to locate the other valve member in any one of a range of positions in accordance with the condition of the steering gear, the relative translational positions of the valve body and valve spool providing a steering effect in the fluid power circuit to urge the steering gear toward alternative positions for prime mover right turn, left turn, or straight ahead travel whereby to cause the prime mover to follow the predetermined path, the relative rotational positions of the valve body and valve spool acting to move the path sensing means between operative and inoperative conditions and to halt fluid flow to portions of the fluid circuit when the path sensing means is in its operative condition, said automatic steering mechanism further including locking means interconnecting the guidance valve means and the path sensing means for locating the guidance valve members in predetermined positions when the path sensing means is deactivated.

* * * * *

UNITED STATES PATENT AND TRADEMARK OFFICE
CERTIFICATE OF CORRECTION

PATENT NO. : 4,161,143
DATED : July 17, 1979
INVENTOR(S) : Mark E. Fasse and Herbert C. Glesmann It is certified that error appears in the above-identified patent and that said Letters Patent are hereby corrected as shown below:

In column 1, line 47 please change "value" to --valve--.

In column 9, line 63 after "lines" please add --192 and 193. Fluid is accepted from the remaining steering line--.

In column 12, Claim 6, line 67 after "turn", please add --left turn,--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*